(12) United States Patent
Suh et al.

(10) Patent No.: US 8,011,001 B2
(45) Date of Patent: Aug. 30, 2011

(54) METHOD FOR MANAGING SECURITY IN A MOBILE COMMUNICATION SYSTEM USING PROXY MOBILE INTERNET PROTOCOL AND SYSTEM THEREOF

(75) Inventors: Kyung-Joo Suh, Suwon-si (KR);
Hyeon-Woo Lee, Suwon-si (KR);
Beom-Sik Bae, Suwon-si (KR);
Jae-Chon Yu, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 933 days.

(21) Appl. No.: 11/829,505

(22) Filed: Jul. 27, 2007

(65) Prior Publication Data
US 2008/0028459 A1    Jan. 31, 2008

(30) Foreign Application Priority Data
Jul. 28, 2006   (KR) .................. 10-2006-0071788

(51) Int. Cl.
*G06F 9/00* (2006.01)
*G06F 15/16* (2006.01)
*G06F 17/00* (2006.01)
*G06F 7/04* (2006.01)
*G06F 17/30* (2006.01)
*H04L 29/06* (2006.01)
*H04K 1/00* (2006.01)
*H04L 9/32* (2006.01)

(52) U.S. Cl. .............. 726/12; 726/4; 380/247; 380/270; 713/168

(58) Field of Classification Search ........................ None
See application file for complete search history.

(56) References Cited

U.S. PATENT DOCUMENTS

| | | | |
|---|---|---|---|
| 7,277,416 B1 * | 10/2007 | Chang et al. | 370/338 |
| 7,551,915 B1 * | 6/2009 | Manning et al. | 455/411 |
| 2003/0142650 A1 * | 7/2003 | Fan | 370/338 |
| 2004/0234075 A1 * | 11/2004 | Leung | 380/270 |
| 2006/0078119 A1 * | 4/2006 | Jee et al. | 380/247 |
| 2007/0016774 A1 * | 1/2007 | Bakshi | 713/168 |
| 2007/0091843 A1 * | 4/2007 | Patel et al. | 370/331 |
| 2007/0101408 A1 * | 5/2007 | Nakhjiri | 726/4 |
| 2007/0230453 A1 * | 10/2007 | Giaretta et al. | 370/389 |
| 2007/0274266 A1 * | 11/2007 | Oyama et al. | 370/335 |

* cited by examiner

*Primary Examiner* — Shin-Hon Chen
(74) *Attorney, Agent, or Firm* — The Farrell Law Firm, P.C.

(57) ABSTRACT

A security management method in a mobile communication system supporting Proxy Mobile Internet Protocol (IP). In the security management method, a Mobile Node (MN), a Serving Packet Data Service Node (S-PDSN), and an Authentication, Authorization and Accounting (AAA) server generate a security key of the Proxy Mobile IP. Upon receipt of information for authentication of a security key from the MN, the S-PDSN sends an access request message to the AAA server and receives information for verification of the security key. The S-PDSN sends a first message for requesting verification of the security-related key to a Home Agent (HA). The HA verifies the security-related key through the AAA server and sends a second message to the S-PDSN when the security-related key is verified. The S-PDSN sends a message indicating initiation of the Proxy Mobile IP, to the MN.

23 Claims, 7 Drawing Sheets

METHOD FOR MANAGING SECURITY IN A MOBILE COMMUNICATION SYSTEM USING PROXY MOBILE INTERNET PROTOCOL AND SYSTEM THEREOF

PRIORITY

This application claims priority under 35 U.S.C. §119(a) to a Korean Patent Application filed in the Korean Intellectual Property Office on Jul. 28, 2006 and assigned Serial No. 2006-71788, the disclosure of which is incorporated herein by reference.

BACKGROUND OF THE INVENTION

1. Field of the Invention

The present invention generally relates to a security management method in a mobile communication system and a system thereof, and in particular, to a security management method in a mobile communication system using Mobile Internet Protocol (IP) and a system thereof.

2. Description of the Related Art

Owing to the remarkable progress of the Internet technology, IP-based communication networks have been rapidly developing. In an IP-based communication network, a user terminal can exchange data with a system that provides a service, using an allocated IP address. In addition, there are several methods capable of exchanging data using a network addressing system for transmitting data to a mobile terminal, or mobile node, even in a mobile communication system, and Mobile IP technology is a typical scheme for allocating an IP address to a mobile node, among the methods capable of exchanging data using the network addressing system. The rapid progress of mobile communication system and Wireless Local Area Network (LAN) service technology has caused an increase in numbers of users using mobile nodes. Mobile IP technology manages locations of mobile nodes and provides seamless communication to mobile nodes even during handoff in mobile communication systems.

Mobile IP technology is now under active discussion in an Internet Engineering Task Force (IETF), one of a variety of standard groups, and as to a version of Mobile IP, since Mobile IP v4 (IPv4) was proposed, Mobile IP v6 (IPv6) has recently been proposed. That is, an IP-based communication network based on IPv4 is now evolving into IPv6, an advanced scheme, to increase a limit of allocable IP resources and a number of users and provide various services. A noticeable characteristic of IPv6 lies in an increase in a length of an IP address from 32 bits to 128 bits, enabling accommodation of an increasing number of subscribers.

Mobile IP technology has considerable overhead of the protocol itself when Mobile IP technology is used in a mobile communication system. Therefore, $3^{rd}$ Generation Partnership Project 2 (3GPP2), a standard group for mobile communication technology, has proposed a Proxy Mobile IP technology to reduce overhead. The Proxy Mobile IP technology is now undergoing standardization. Along with standardization, research is being conducted to use Proxy Mobile IP in mobile communication systems to improve performance. In particular, 3GPP2 intends to use Proxy Mobile IP for performance improvement of handoff, and a corresponding standard is under discussion.

More specifically, a discussion is being made on the overall control and data flow in a mobile communication system using Proxy Mobile IP. However, there is no research on a security mechanism for guaranteeing a safe communication service in a mobile communication system intending to use Proxy Mobile IP. That is, Proxy Mobile IP, compared to existing Mobile IP technology, can reduce latency occurring during handoff, but there is no proposed technology for managing security in a wireless environment supporting Proxy Mobile IP. Therefore, there is a need for a scheme for managing security of mobile nodes in a mobile communication system supporting Proxy Mobile IP.

SUMMARY OF THE INVENTION

The present invention addresses at least the above problems and/or disadvantages and provides at least the advantages described below. Accordingly, an aspect of the present invention is to provide a method for managing security in a mobile communication system using Proxy Mobile IP, and a system thereof.

Another aspect of the present invention is to provide a method for managing security during handoff in a mobile communication system using Proxy Mobile IP, and a system thereof.

Still another aspect of the present invention is to provide a security management method for reducing latency during handoff in a mobile communication system using Proxy Mobile IP, and a system thereof.

According to an aspect of the present invention, there is provided a method for managing security in a mobile communication system using Proxy Mobile IP. The security management method includes generating a security key of the Proxy Mobile IP by a Mobile Node (MN), a Serving Packet Data Service Node (S-PDSN), and an Authentication, Authorization and Accounting (AAA) server; upon receipt of information for authentication of a security key from the MN, sending, by the S-PDSN, an access request message to the AAA server and receiving information for verification of the security key; sending, by the S-PDSN, a first message for requesting verification of the security key to a Home Agent (HA); verifying, by the HA, the security key through the AAA server and sending a second message to the S-PDSN when the security key is verified; and sending, by the S-PDSN, a message indicating initiation of the Proxy Mobile IP, to the MN.

According to another aspect of the present invention, there is provided a mobile communication system using Proxy Mobile IP. The mobile communication system includes a PDSN for sending an access request message to an AAA server upon receipt of an initiation request message including authentication key-related information from a MN, receiving information for verification of a security key of Proxy Mobile IP from the AAA server, sending a first message for requesting the verification to a HA, and sending information indicating initiation of Proxy Mobile IP to the MN when the verification is successful; the AAA server for providing information for verification of the security key to the PDSN, and performing access accept in response to a request of the HA; and the HA for verifying validity of the security key upon receipt of the access accept message from the AAA server, and sending a second message to the PDSN when the verification is successful.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF PREFERRED EMBODIMENTS

Preferred embodiments of the present invention will now be described with reference to the annexed drawings. In the following description, a detailed description of known functions and configurations incorporated herein has been omitted for clarity and conciseness.

The present invention provides a security management scheme for generating and transmitting a security key and authentication data for authenticating the security key in a mobile communication system using Proxy Mobile Internet Protocol (IP). For example, the security management scheme of the present invention generates and authenticates a security key according to the present invention when a context of a mobile node is transferred during a handoff of a mobile node that intends to move from a Serving Packet Data Service Node (S-PDSN) presently accessed by the mobile node itself, to a Target Packet Data Service Node (T-PDSN). In this manner, the security management scheme of the present invention can perform a fast handoff while performing security management.

A description of the present invention will now be made assuming that a mobile node performs handoff. However, the security management scheme according to the present invention in a mobile communication system using Proxy Mobile IP is not necessarily limited to the handoff. For example, the security management scheme of the present invention can also be applied to an initialization operation of a mobile node.

Figure 1:
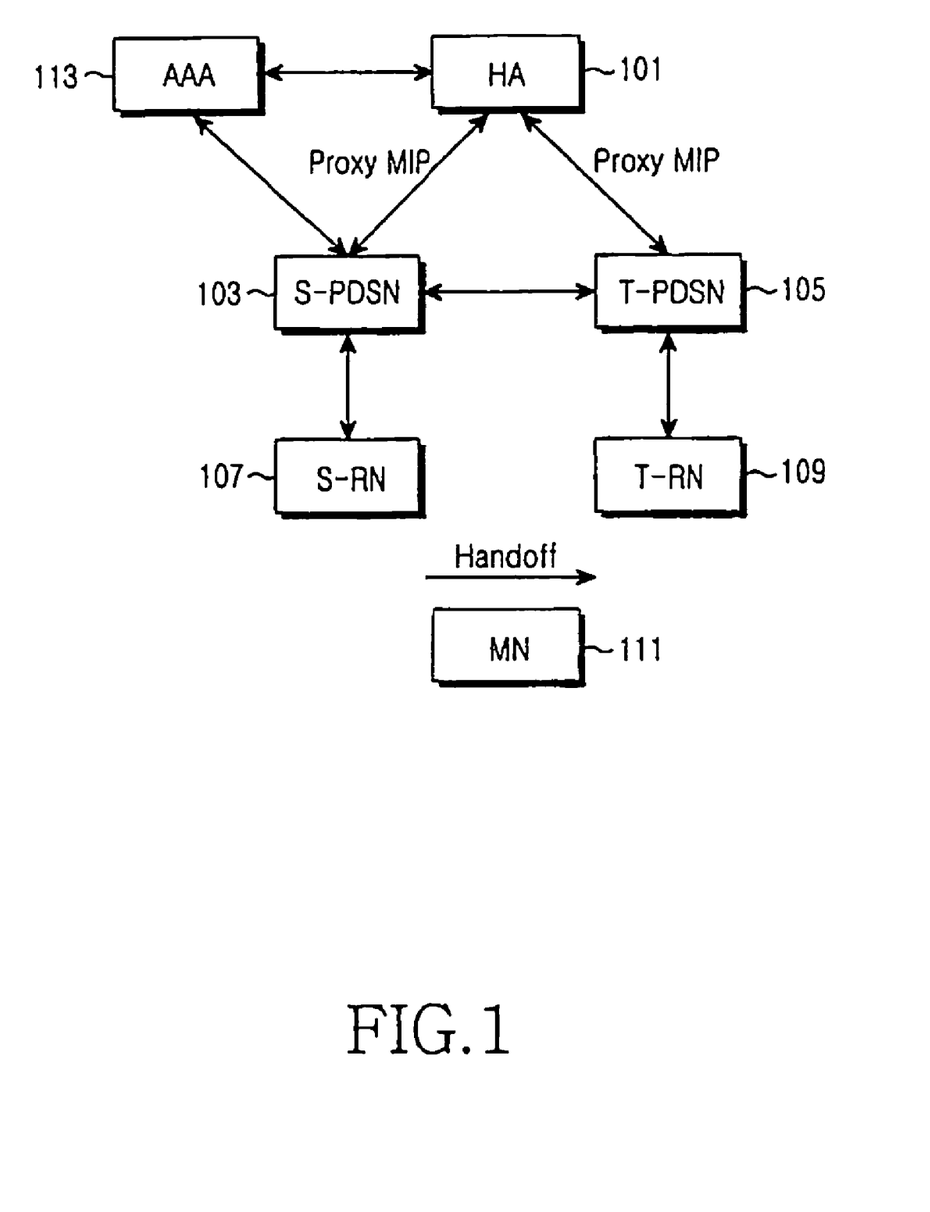
FIG. 1 is a block diagram of a mobile communication system using Proxy Mobile IP according to the present invention.

FIG. 1 shows a mobile communication system using Proxy Mobile IP according to the present invention. The mobile communication system of FIG. 1 includes a Home Agent (HA) 101, an S-PDSN 103, a T-PDSN 105, a Serving Radio Network (S-RN) 107, a Target Radio Network (T-RN) 109, a Mobile Node (MN) 111, and an Authentication, Authorization and Accounting (AAA) server 113. The S-PDSN 103 and the T-PDSN 105 communicate with the HA 101 using Proxy Mobile IP. The MN 111 can use either Simple IP or Mobile IP. However, the MN 111 operates independently of Proxy Mobile IP used in the PDSNs 103 and 105. As stated above, the MN 111, presently accessing a Serving Radio Network (S-RN) 107 monitored by the S-PDSN 103, is assumed to be performing a handoff to a Target Radio Network (T-RN) 109 monitored by the T-PDSN 105.

Figure 2:
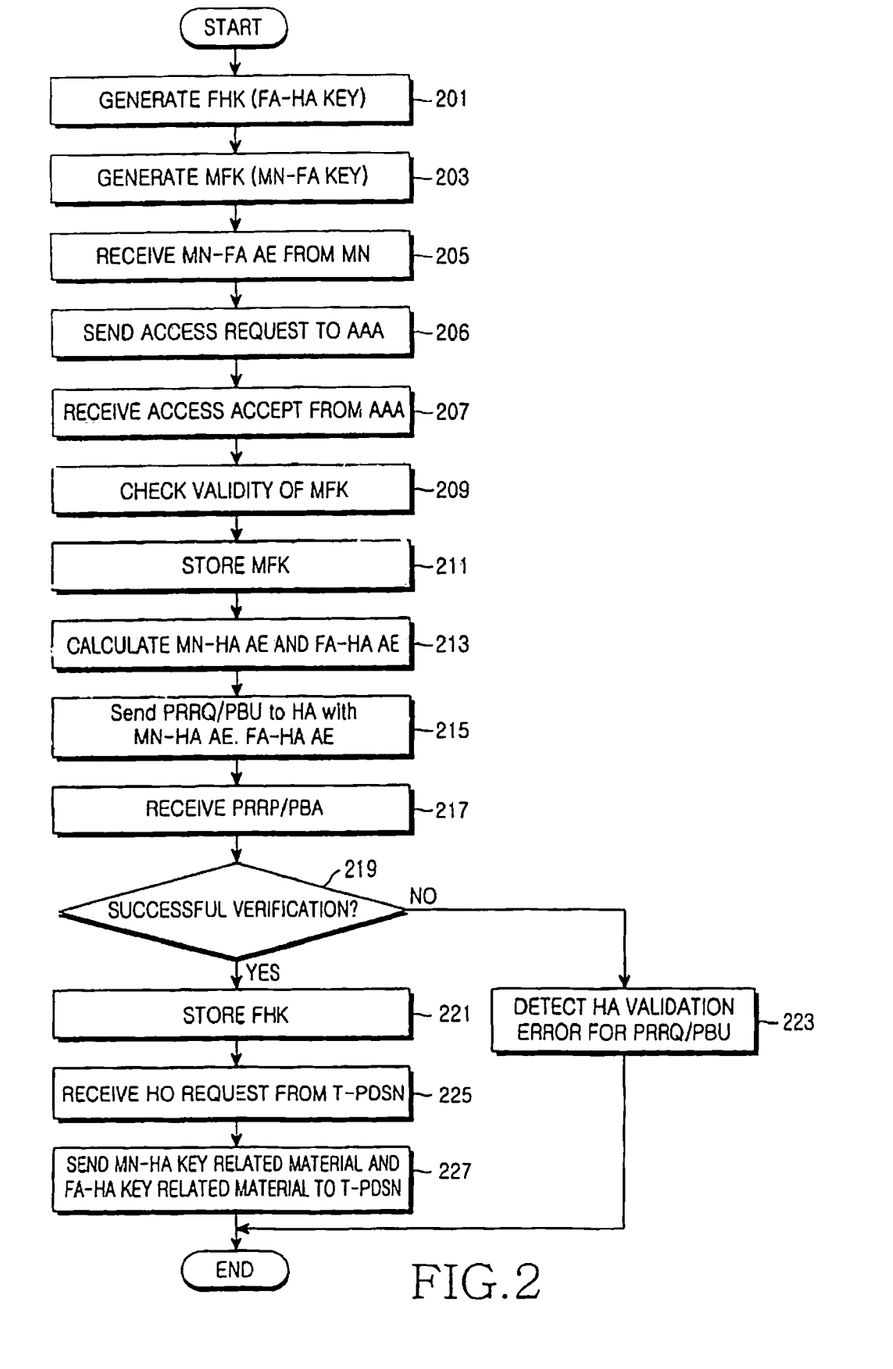
FIG. 2 is a flowchart illustrating an operation of an S-PDSN when a mobile node performs handoff according to the present invention.

FIG. 2 shows an operation of an S-PDSN when a mobile node performs a handoff according to the present invention. In FIG. 2, step 201 indicates an operation performed when an MN 111 undergoes initial registration. In step 201, an S-PDSN 103 generates a Foreign Agent (FA)-HA Key (FHK) as a security key for authenticating an undepicted FA and an HA 101. The FHK is derived from, for example, a time stamp, an address of the HA, an address of the PDSN, and a Home of Address (HoA) of the MN. In step 203, the S-PDSN 103 generates an MN-FA Key (MFK) as a security key for authenticating an MN and an FA, and the MFK is derived from a time stamp, an address of the FA, and an HoA of the MN. In step 205, the S-PDSN 103 receives, from the MN 111, an MN-FA Authentication Extension (AE) as information for verification of the security key. The AE indicates a calculated value used for verifying whether an authentication key value is valid.

Thereafter, in step 206, the S-PDSN 103 sends an access request message to an Authentication, Authorization and Accounting (AAA) 113. In step 207, the S-PDSN 103 receives an access accept from the AAA 113. MFK generated in the AAA 113 is then transferred to the S-PDSN 103 in an encrypted form, and MN-HA key-related material including MHK, Care of Address (CoA), HoA, and mobility header Security Parameter Index (SPI) is transferred to the S-PDSN 103 along with an access accept message. The access accept message carries FA-HA key-related material including FHK, CoA, HoA, and mobility header SPI from the AAA 113 to the S-PDSN 103.

In step 209, the S-PDSN 103 verifies validity of the MFK received in step 207, and this verification operation is possible by comparing the MFK with the MN-FA AE. In step 211, the S-PDSN 103 stores the verified MFK in memory (not shown). Thereafter, in step 213, the S-PDSN 103 calculates MN-HA AE and FA-HA AE to verify MN-HA and FA-HA authentication. In step 215, the S-PDSN 103 sends the calculated MN-HA AE and FA-HA AE to the HA 101 over a Proxy Registration ReQuest/Proxy Binding Update (PRRQ/PBU). In step 217, the S-PDSN 103 receives Proxy Registration Response/Proxy Binding Acknowledgement (PRRP/PBA), or a registration message for using Proxy Mobile IP, in response to the PRRQ/PBU sent to the HA 101. In step 219, the S-PDSN 103 determines whether the verification is successful in the HA 101. If it is determined in step 219 that the PRRP/PBA from the HA 101 indicates successful verification, the S-PDSN 103 stores the FHK in memory in step 221. The verification of the MN 111 has now been described.

A description will now be made of a process in which the verification of the MN 111 is achieved during handoff of the MN 111. When the MN 111 performs handoff to a T-PDSN 105, the S-PDSN 103 receives a handoff request (HO request) from the T-PDSN 105 in step 225, and sends, in step 227, MN-HA key-related material and FA-HA key-related material to the T-PDSN 105 in response to the handoff request in a context transfer process. However, when step 219 determines that the verification is not successful in the HA 101, the S-PDSN 103 recognizes that the verification is failed in the HA 101. Therefore, the S-PDSN 103 detects occurrence of an HA validation error for the PRRQ/PBU in step 223.

Figure 3:
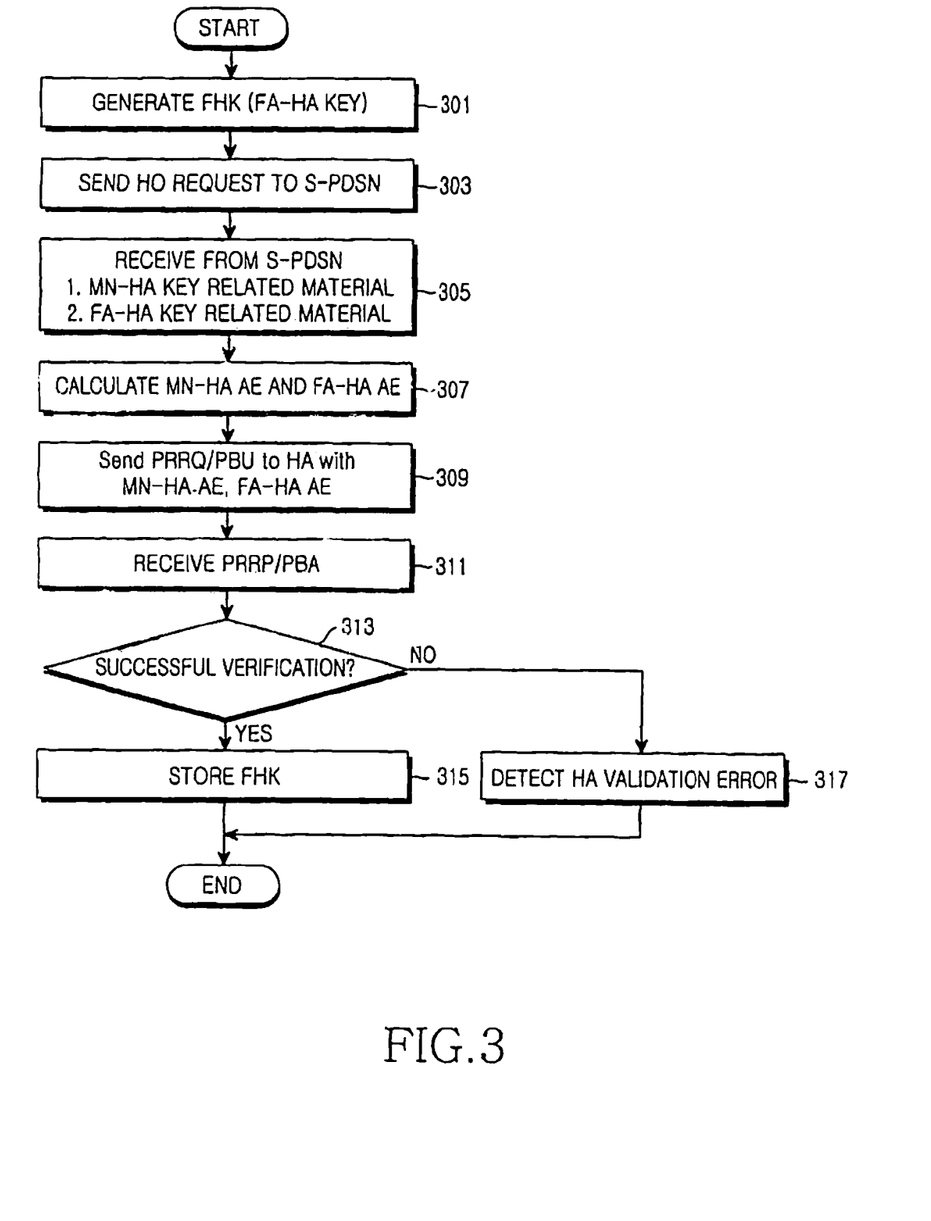
FIG. 3 is a flowchart illustrating an operation of a Target PDSN (T-PDSN) when a mobile node performs handoff according to the present invention.

FIG. 3 shows an operation of a T-PDSN when a mobile node performs handoff according to the present invention. In FIG. 3, in step 301, a T-PDSN 105 generates an FHK as security information, and the FHK is generated from a time stamp, an address of the HA, an address of the PDSN, and an HoA of the MN. In step 303, the T-PDSN 105 sends a handoff request to an S-PDSN 103. In step 305, the T-PDSN 105 receives, from the S-PDSN 103, a handoff response message including MN-HA key-related material with MHK, CoA, HoA and the SPI of the mobility header, and FA-HA key-related material with FHK, CoA, HoA, and the SPI of the mobility header. In step 307, the T-PDSN 105 calculates MN-HA AE and FA-HA AE from the MN-HA key-related material and the FA-HA key-related material received in step 305, respectively. In step 309, the T-PDSN 105 sends a PRRQ/PBU including the calculated MN-HA AE and FA-HA AE to an HA 101. Then the HA 101 performs key verification with the MN-HA AE and FA-HA AE received from the T-PDSN 105, and sends the verification result to the T-PDSN 105 over PRRP/PBA. In step 311, the T-PDSN 105, shown in FIG. 1, determines from the received PRRP/PBA whether the verification is successful. If the T-PDSN 105 determines in step 311 that the verification is successful, the T-PDSN 105 proceeds to step 315 where the T-PDSN 105 stores the FHK in memory (not shown). However, when the T-PDSN 105 determines in step 313 that the verification is failed in the HA 101, the T-PDSN 105 recognizes in step 317 that the verification is failed in the HA 101.

Figure 4:
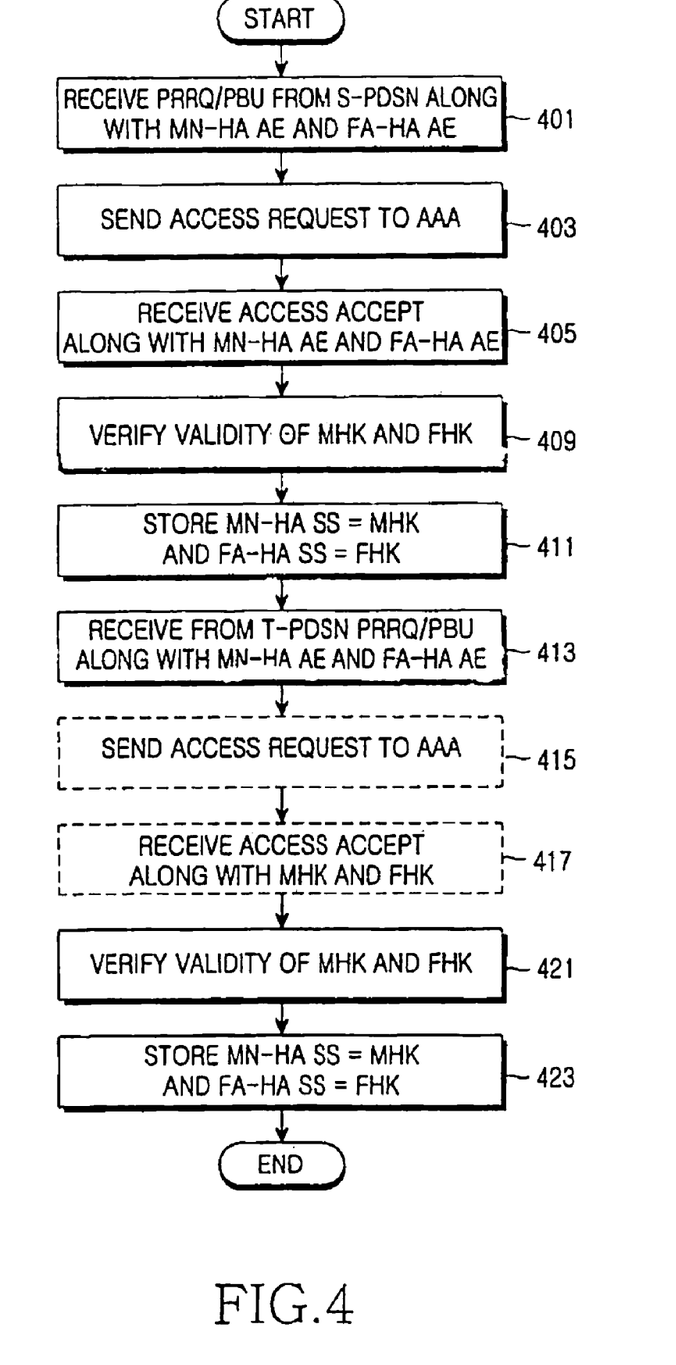
FIG. 4 is a flowchart illustrating an operation of an HA when a mobile node performs handoff according to the present invention.

FIG. 4 shows an operation of an HA when a mobile node performs handoff according to the present invention. In FIG. 4, in step 401, an HA 101 receives a PRRQ/PBU from an S-PDSN 103 together with MN-HA AE and FA-HA AE. In step 403, the HA 101 sends an access request to an AAA 113. Upon receipt of an access accept from the AAA 113 along with MHK and FHK in step 405, the HA 101 verifies the MHK and FHK using the MN-HA AE and FA-HA AE in step 409. In step 411, the HA 101 stores the verified MHK and FHK as Mobile Node-Home Agent Session Secrete (MN-HA SS) and Foreign Agent-Home Agent Session Secrete (FA-HA SS), respectively. In step 413, the HA 101 receives a PRRQ/PBU including MN-HA AE and FA-HA AE from a T-PDSN 105.

Thereafter, the HA 101 sends an access request to the AAA 113 in step 415, and receives an access accept with MFK and FHK from the AAA 113 in step 417. Steps 415 and 417, indicated by dotted lines, are optional in an optimization process of the handoff procedure. When the two steps are omitted, the HA 101 can verify validity in step 409, and use the MHK and FHK stored therein for the verification in step 411. In step 421, the HA 101 verifies the MFK and FHK with the MN-HA AE and FA-HA AE received from the T-PDSN 105, using the MFK and FHK received from the AAA 113 or the MFK and FHK stored in the HA 101. Thereafter, in step 423, HA 101 stores the MHK in the MN-HA SS and the FHK in the FA-HA SS, and then uses them for a communication session.

Figure 5:
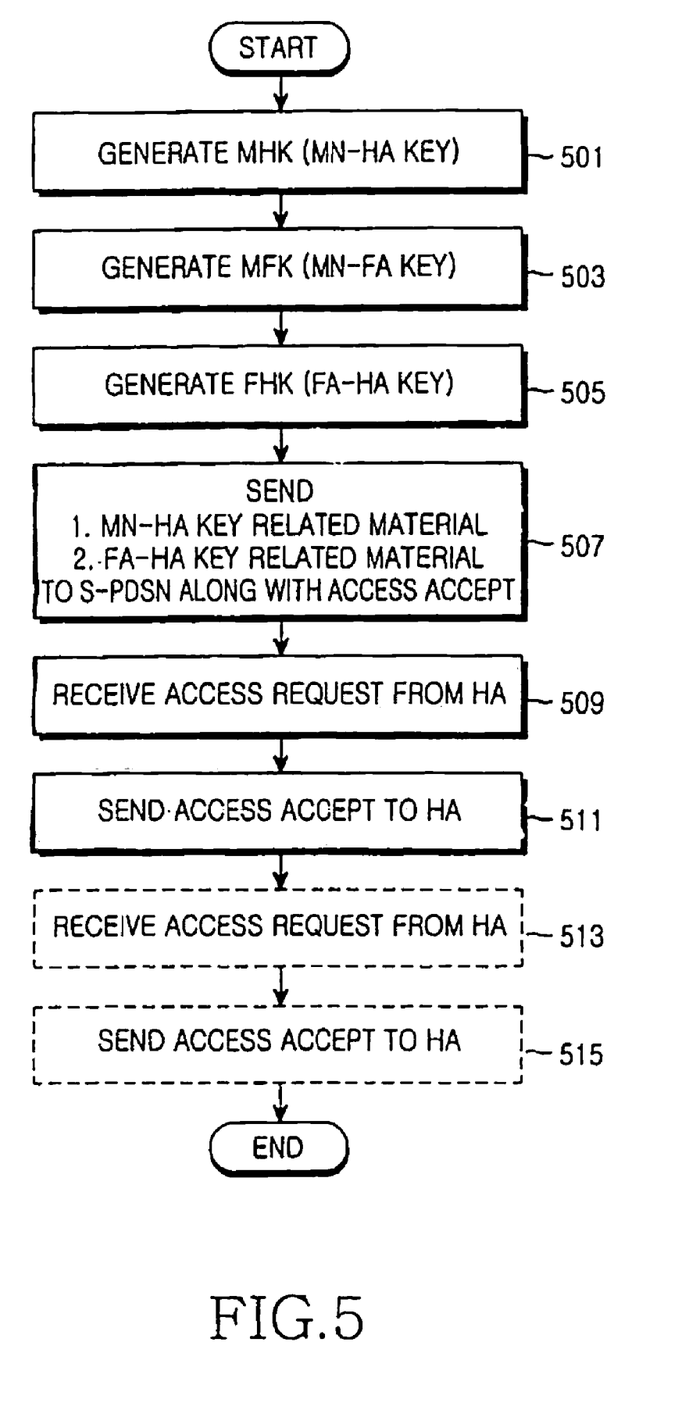
FIG. 5 is a flowchart illustrating an operation of an AAA when a mobile node performs handoff according to the present invention.

FIG. 5 shows an operation of an AAA when a mobile node performs handoff according to the present invention. In FIG. 5, in steps 501 to 505, an AAA 113 generates MHK, MFK and FHK as security information of a mobile node, and the generation order is subject to change. In step 501, the AAA 113 derives an MN-HA key (MHK) from a time stamp, an address of the HA and an HoA of the MN. In step 503, the AAA 113 derives an MN-FA key (MFK) from a time stamp, an address of the PDSN, and an HoA of the HA. In step 505, the AAA 113 derives an FA-HA key (FHK) from time stamp, an address of the HA, an address of the PDSN, and an HoA of the MN. Thereafter, upon receipt of an access request from an S-PDSN 103, the AAA 113 sends in step 507 the MFK to the S-PDSN 103 in the encrypted form, and also sends MN-HA key-related material (MHK, CoA, HoA, and the SPI of the mobility header) and FA-HA key-related material (FHK, CoA, HoA, and the SPI of the mobility header) along with an access accept message in response to thereto. Thereafter, upon receiving in step 509 from an HA 101 an access request which is a following message of the PRRQ/PBU sent from the S-PDSN 103 to the HA 101, the AAA 113 sends in step 511 an access accept to the HA 101 in response thereto and sends MHK and FHK to achieve a key verification operation in the HA 101. Thereafter, when an MN 111 performs handoff from the S-PDSN 103 to a T-PDSN 105, the AAA 113 receives an access request from the HA 101 in step 513 and sends an access accept message to the HA 101 along with MHK and FHK in step 515, so the MHK and FHK can be used during verification in the HA 101. Steps 513 and 515 are optional when necessary for optimization.

Figure 6A:
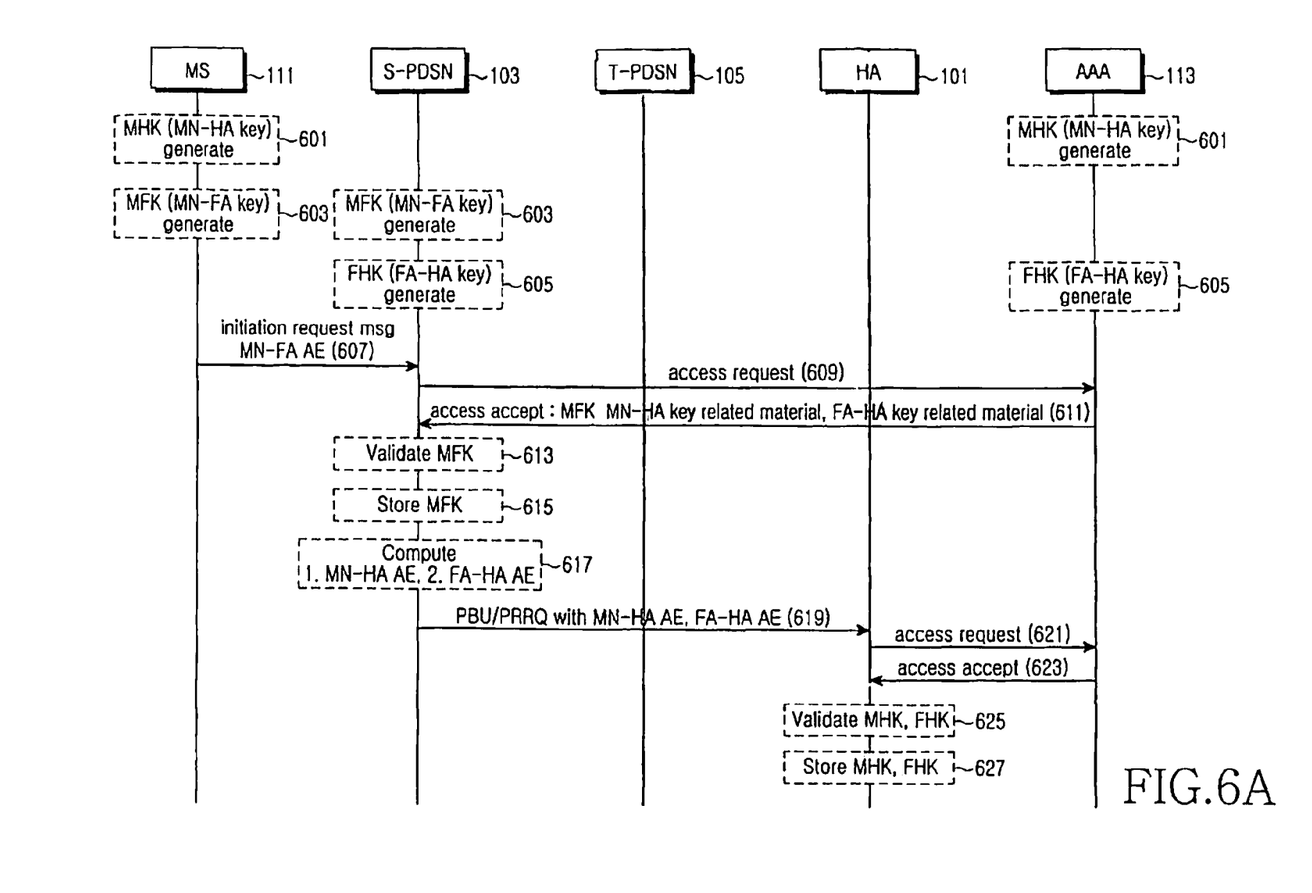
FIGS. 6A and 6B are signaling diagrams illustrating a security management method during handoff in a mobile communication system using Proxy Mobile IP according to the present invention.
Figure 6B:
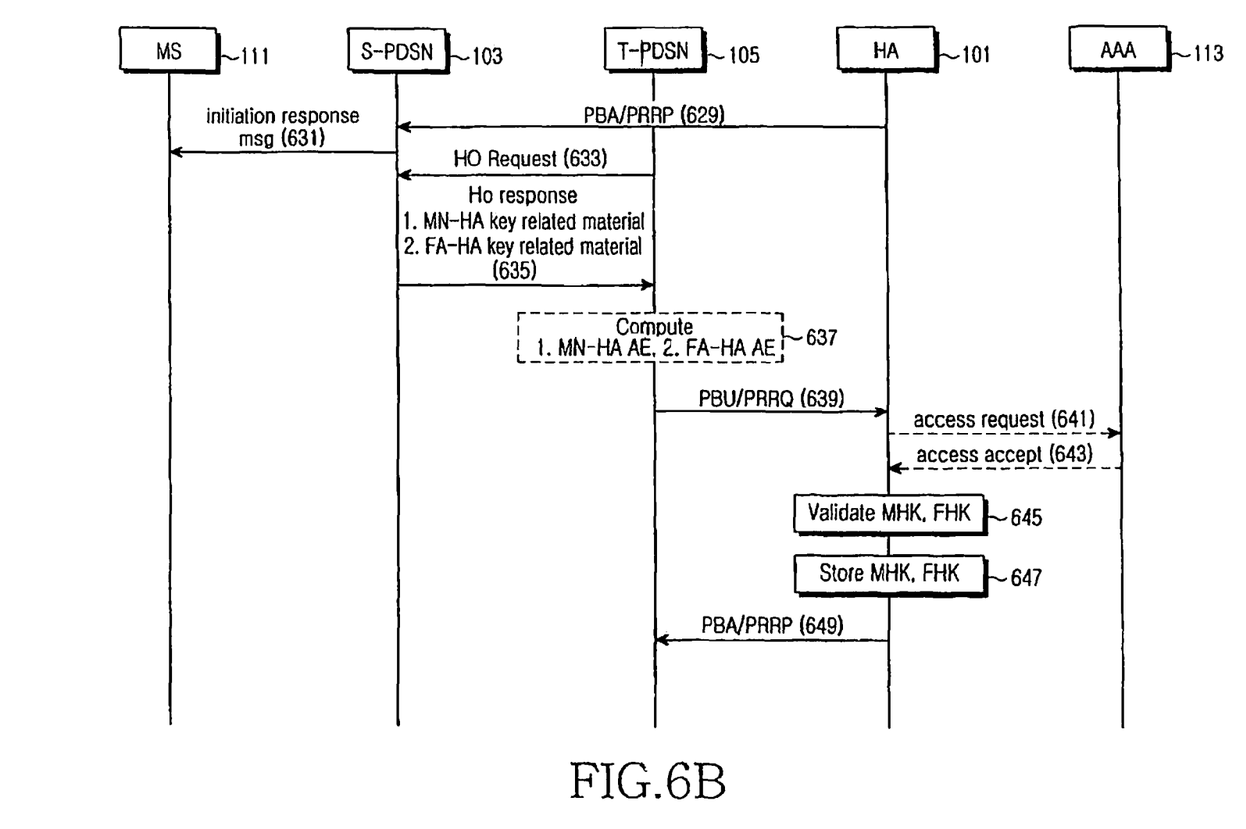

FIGS. 6A and 6B show a security management method during handoff in a mobile communication system using Proxy Mobile IP according to an embodiment of the present invention. In FIGS. 6A and 6B, in step 601, an AAA 113 and an MN 111 generate an MN-HA key (MHK) as security information. The generated MHK is a key derived as described above. In step 603, the MN 111 and an S-PDSN 103 derive an MN-FA key (MFK) as security information. In step 605, the AAA 113 and the S-PDSN 103 derive an FA-HA key (FHK). In step 607, the MN 111 sends MN-FA AE to the S-PDSN 103 along with an initiation request message. In step 609, the S-PDSN 103 sends an access request message to the AAA 113. In step 611, the AAA 113 sends MFK, MN-HA key-related material, and FA-HA key-related material to the S-PDSN 103. The S-PDSN 103 verifies MFK in step 613, and stores the verified MFK in step 615. In step 617, the S-PDSN 103 calculates MN-HA AE and FA-HA AE from the MN-HA key-related material and FA-HA key-related material received in step 611. In step 619, the S-PDSN 103 sends a PRRQ/PBU message to the HA 101 along with the calculated MN-HA AE and FA-HA AE. In step 621, the HA 101 sends an access request to the AAA 113. Upon receipt of an access accept from the AAA 113 along with MHK and FHK in step 623, the HA 101 verifies the received MHK and FHK in step 625, and stores the verified MHK and FHK in step 627.

In step 629, the HA 101 sends a PBA/PRRP message to the S-PDSN 103. In step 631, the S-PDSN 103 sends an initiation response message to the MN 111, completing authentication through a Proxy Mobile IP initiation process. Thereafter, in step 633, the T-PDSN 105 sends a handoff request (HO request) to the S-PDSN 103. In step 635, the S-PDSN 103 transfers a context to the T-PDSN 105 along with MN-HA key-related material and FA-HA key-related material. The T-PDSN 105 calculates MN-HA AE and FA-HA AE in step 637, and sends the calculated MN-HA AE and FA-HA AE to the HA 101 along with a PBU and/or PRRQ message in step 639. Thereafter, in step 641, the HA 101 sends an access request to the AAA 113. In step 643, the AAA 113 sends an access accept message to the HA 101. Herein, steps 641 and 643 are optional for optimization of the handoff procedure. When the two steps are omitted, validity is checked in the HA 101 through steps 625 and 627 and the stored MHK and FHK are used during validity check of step 645. The key stored in step 627 is valid for one session. The HA 101 verifies the MHK and FHK in step 645, and stores the verified MHK and FHK in step 657. Thereafter, the HA 101 sends PBA and PRRP to the T-PDSN 105, completing a handoff-related security management operation. The use of the present invention can solve the latency and security problems during handoff in the mobile communication environment using Proxy Mobile IP.

As is apparent from the foregoing description, the present invention provides a detailed scheme for generating, verifying and sending security-related key and authentication data in a mobile communication system using Proxy Mobile IP, thereby providing a security management mechanism in a communication network using Proxy Mobile IP.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for managing security in a mobile communication system using Proxy Mobile Internet Protocol (IP), the method comprising:
generating a security key of the Proxy Mobile IP by a Mobile Node (MN), a Serving Packet Data Service Node (S-PDSN), and an Authentication, Authorization and Accounting (AAA) server;
upon receipt of information for verifying information for authentication of the security key from the MN, sending, by the S-PDSN, an access request message to the AAA server and receiving information for authentication of the security key;
sending, by the S-PDSN, a first message for requesting verification of the security key to a Home Agent (HA);
verifying, by the HA, the security key through the AAA server and sending a second message to the S-PDSN when the security key is verified; and
sending, by the S-PDSN, a message indicating initiation of the Proxy Mobile IP, to the MN,
wherein the information for verifying information for authentication of the security key is for verifying whether the information for authentication of the security key is valid; and
wherein the information for authentication of the security key comprises data for authenticating the security key.

2. The method of claim 1, wherein the security key comprises at least one of an MN-HA security key, an MN-Foreign Agent (FA) security key, and an FA-HA security key.

3. The method of claim 1, further comprising:
upon receiving the information for authentication of the security key from the AAA server, verifying, by the S-PDSN, validity of the information for authentication of the security key using the information for verifying the information for authentication of the security key, and storing the security key when the validity verification is successful.

4. The method of claim 1, further comprising:
storing, by the HA, the security key when the information for authentication of the security key is verified.

5. A method for managing security in a first Packet Data Service Node (PDSN) of a mobile communication system using Proxy Mobile Internet Protocol (IP), the method comprising:
generating and sending an access request message to an Authentication, Authorization and Accounting (AAA) server upon receiving from an Mobile Node (MN) an initiation request message including information for verifying information for authentication of a security key;
upon receipt of an access accept message including information for authentication of a security key from the AAA server, sending to a Home Agent (HA) of the MN a first message for requesting verification of information for authentication of the security key included in the access accept message; and
sending an initiation response message to the MN when a response message to the first message, received from the HA, indicates successful Verification,
wherein the information for verifying information for authentication of the security key is for verifying whether the information for authentication of the security key is valid; and
wherein the information for authentication of the security key comprises data for authenticating the security key.

6. The method of claim 5, further comprising:
upon receipt of the access accept message, verifying validity of information for authentication of an MN-Foreign Agent (FA) security key (MFK) using the information for verifying information for authentication of the security key, received from the MN, and storing the MFK when the information for authentication of the MFK is verified.

7. The method of claim 6, wherein the MFK is derived from a time stamp, an address of the FA, and a Home of Address (HoA) of the MN.

8. The method of claim 5, further comprising:
receiving MN-HA key-related material along with the access accept message.

9. The method of claim 8, wherein the MN-HA key-related material comprises Care of Address (CoA), HoA, and mobility header Security Parameter Index (SPI).

10. The method of claim 5, wherein the first message comprises MN-HA Authentication Extension (AE) for verifying information for authentication of an MN-HA key, and FA-HA AE for verifying information for authentication of an FA-HA key.

11. The method of claim 10, wherein the first message is Proxy Registration ReQuest/Proxy Binding Update (PRRQ/PBU) for use of Proxy Mobile IP.

12. The method of claim 5, further comprising:
storing a security key corresponding to a response message to the first message.

13. The method of claim 12, wherein the response message to the first message is Proxy Registration Response/Proxy Binding Acknowledgement (PRRP/PBA) for use of Proxy Mobile IP.

14. The method of claim 5, further comprising:
upon receipt of a handoff request message of the MN from a second PDSN, sending authentication key-related information to the second PDSN.

15. The method of claim 14, wherein the authentication key-related information comprises MN-HA key-related material and FA-HA Key-related material.

16. The method of claim 5, further comprising:
sending a handoff request message to a second PDSN when there is a need to provide a service to a second MN that is presently receiving a service from the second PDSN;
upon receipt of a handoff response message including security key-related information of the second MN from the second PDSN, sending to an HA of the second MN a second message for requesting verification of the security key-related information; and
performing a handoff when a response message to the second message, received from the HA of the second MN, indicates successful verification of the security key-related information.

17. The method of claim 16, further comprising:
storing the security key when the verification of the security key-related information is successful.

18. A method for managing security in a Home Agent (HA) of a mobile communication system using Proxy Mobile Internet Protocol (IP), the method comprising:
sending an access request message to an Authentication, Authorization and Accounting (AAA) server upon receipt of a first message for requesting verification of information for authentication of a security key, from a Serving Packet Data Service Node (S-PDSN) of a Mobile Node (MN); and upon receipt of an access response message including information for authentication of the security key from the AAA server, verifying validity of the information for authentication of the security key, and sending a response message to the first message to the S-PDSN, wherein the information for verifying information for authentication of the security key is for verifying whether the information for authentication of the security key is valid; and wherein the information for authentication of the security key comprises data for authenticating the security key.

19. The method of claim 18, wherein the first message comprises MN-HA Authentication Extension (AE) for verifying information for authentication of an MN-HA key, and FA-HA AE for verifying information for authentication of an FA-HA key.

20. The method of claim 18, further comprising:
storing the security key when the validity verification is successful.

21. A method for managing security in an Authentication, Authorization and Accounting (AAA) server of a mobile communication system using Proxy Mobile Internet Protocol (IP), the method comprising:

receiving an access request message including information for verifying information for authentication of the security key from a Packet Data Service Node (PDSN); and generating and sending an access accept message including the information for authentication of the security key to the PDSN, wherein the information for verifying information for authentication of the security key is for verifying whether the information for authentication of the security key is valid; and wherein the information for authentication of the security key comprises data for authenticating the security key.

22. The method of claim 21, further comprising:
sending an access response message including security key-related information upon receipt of an access request message including security key-related information of an MN from a Home Agent (HA).

23. A mobile communication system using Proxy Mobile Internet Protocol (IP), the system comprising:

a Packet Data Service Node (PDSN) for sending an access request message to an Authentication, Authorization and Accounting (AAA) server upon receipt of an initiation request message including information for verifying information for authentication of a security key from a Mobile Node (MN), receiving information for authentication of the security key of Proxy Mobile IP from the AAA server, sending a first message for requesting the verification to a Home Agent (HA), and sending information indicating initiation of Proxy Mobile IP to the MN when the verification is successful;

the AAA server for providing the information for the authentication of the security key to the PDSN, and performing access accept in response to a request of the HA; and the HA for verifying validity of information for authentication of the security key upon receipt of an access accept message including the information for authentication of the security key from the AAA server, and sending a second message to the PDSN when the verification is Successful, wherein the information for verifying information for authentication of the security key is for verifying whether the information for authentication of the security key is valid; and wherein the information for authentication of the security key comprises data for authenticating the security key.

* * * * *